US009185468B2

(12) United States Patent
Lakshmanan et al.

(10) Patent No.: US 9,185,468 B2
(45) Date of Patent: Nov. 10, 2015

(54) MP4 CONTAINER FILE FORMATS AND METHODS OF PROCESSING MP4 CONTAINER FILES

(75) Inventors: Chandrasekhar Lakshmanan, Chennai (IN); Punit Mittal, Roorkee (IN); Sandeep Sehgal, Bangalore (IN); Prabhakar Sinha, Bangalore (IN)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days.

(21) Appl. No.: 12/973,279

(22) Filed: Dec. 20, 2010

(65) Prior Publication Data

US 2012/0158802 A1 Jun. 21, 2012

(51) Int. Cl.
G11B 27/00 (2006.01)
H04N 5/93 (2006.01)
H04N 9/80 (2006.01)
H04N 5/917 (2006.01)
H04N 21/854 (2011.01)
G11B 27/10 (2006.01)
G11B 27/32 (2006.01)

(52) U.S. Cl.
CPC ........ *H04N 21/85406* (2013.01); *G11B 27/105* (2013.01); *G11B 27/322* (2013.01); *G11B 2220/2537* (2013.01); *G11B 2220/2545* (2013.01)

(58) Field of Classification Search
USPC ............... 386/239–248, 326–342, 278–290
See application file for complete search history.

(56) References Cited

U.S. PATENT DOCUMENTS

| 7,436,859 | B2 | 10/2008 | Notoya et al. | |
|---|---|---|---|---|
| 8,631,047 | B2 * | 1/2014 | Roenning | 707/803 |
| 2003/0053797 | A1 * | 3/2003 | Oshima et al. | 386/98 |
| 2004/0146285 | A1 * | 7/2004 | Matsui et al. | 386/98 |
| 2011/0317760 | A1 * | 12/2011 | Chen et al. | 375/240.12 |

OTHER PUBLICATIONS

International Standard ISO/IEC 14496-14, "Information technology—Coding of audio-visual objects—Part 14: MP4 file format", International Organization for Standardization, ISO/IEC 14496-14:2003(E), 1st ed., Nov. 15, 2003.

* cited by examiner

Primary Examiner — Hung Dang

(57) ABSTRACT

A file that is compatible with a media player application that reads media files compliant with MP4, is created by including in the file a parent container containing child containers. The child containers include a metadata container containing metadata relating to the media presentation and a media data container containing media samples for multiple tracks of the media presentation. The metadata container contains multiple child containers containing metadata for the multiple tracks respectively. The metadata container contains at least one additional child container that reserves free space in the metadata container but does not contain metadata, whereby in the event of adding a track to the presentation the free space in the additional child container may be overwritten with metadata for the added track without affecting the size of the metadata container.

15 Claims, 9 Drawing Sheets

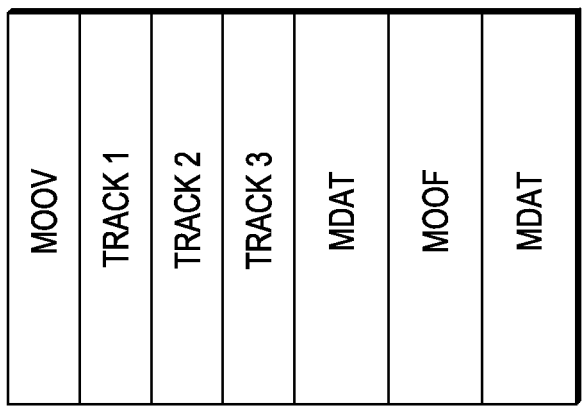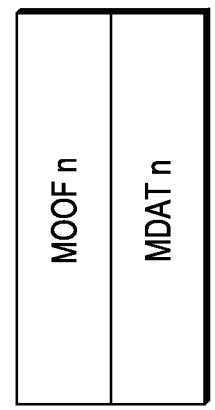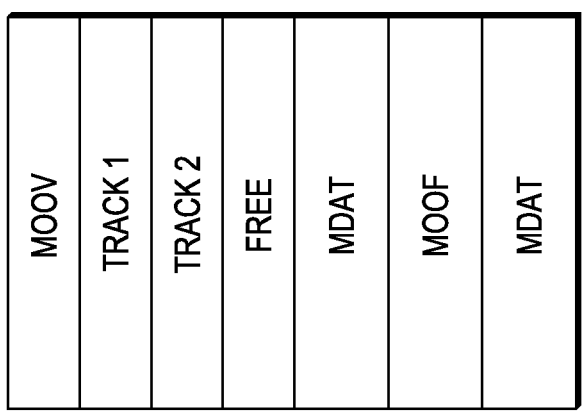
FIG. 6

MP4 CONTAINER FILE FORMATS AND METHODS OF PROCESSING MP4 CONTAINER FILES

BACKGROUND OF THE INVENTION

The subject matter disclosed herein relates to MP4 container file formats and methods of processing MP4 container files.

ISO/IEC 14496-14:2003, otherwise known as MPEG-4 Part 14, and commonly known as MP4, defines a file format that allows storage of media content. The MP4 file format is a container format having the ability to hold a variety of media types and their respective data (such as video, audio, metadata, and user information) using a common format. In general, an MP4 file is logically divided into tracks. Each track represents a timed sequence of presentation units and within each track each timed presentation unit is called a sample. A sample may be a frame of video or audio or metadata information. In video, the frame represented may be an I (intra coded) frame or a P (predictive) frame or a B (Bi-directional) frame. An I frame is commonly referred to as a key frame whereas a P frame may be considered to be a dependent frame. The overall media presentation, whether audio, video or both audio and video, is referred to as a movie. All the data within a conforming file is encapsulated in boxes called atoms. No data needed to support presentation of the media samples, whether audio data, video data or metadata, is stored outside the atom structure. Neither the physical structure of the file nor the layout of the media is tied to the time ordering of the media. Generally, an MP4 file is composed of a hierarchy of atoms, in which there is a single top level atom and numerous lower level atoms. A lower level atom may itself contain lower level atoms. A lower level atom has an immediate parent atom, and the lower level atom is considered a sub-atom of its parent atom. The lowest level atom, which does not contain a lower level atom, is referred to as a leaf atom.

The MP4 standard prescribes names for various types of atoms. All the media data representing presentation units (compressed or otherwise) are defined under the atom of type "mdat."

All configuration-related information, metadata describing the nature of the media, the properties of the tracks and their timing requirements, for example, are defined under the atom of type "moov." The MP4 file contains only one moov atom, which generally comes at the beginning of the MP4 file. The moov atom may contain a user data atom "udta" declaring user information about the container atom and its data. FIG. 1 illustrates schematically the arrangement of metadata and media data in a simple MP4 container atom.

The information relating to a track of the movie is contained within the moov atom in an atom "trak." The information also includes an offset value that specifies the location of the relevant media data in the mdat atom.

An MP4 file is read, and the media samples presented, by a media player application. In order to play a particular track, the media player application parses the moov atom to find the track atom, reads the offset value from the track atom and jumps to the offset location in order to read the media data.

In some cases, some of the information is not present in the moov atom but is contained in one or more "moof" atoms, where each moof atom contains trak atoms and has its own corresponding mdat atom (containing media samples) associated therewith. FIG. 2 illustrates schematically this fragmented arrangement of data in an MP4 file. As shown in FIG. 2, a fragmented MP4 file containing moof atoms and associated mdat atoms also contains an mfra (random access for moof) atom. The fragmented structure allows a track to be delivered in multiple segments or fragments, such as different scenes. Different fragments of a movie are presented sequentially. In order to play back a particular track, the media player application must find the trak atoms in the moov atom and each of the moof atoms, read the offset value from each trak atom, compute the offset from the beginning of the movie, and jump to the computed offset location in each mdat atom in order to read the media data.

Among the metadata stored in the moov atom (and in the moof atoms in the case of a fragmented movie) is a duration value. In the case of an MP4 file that is not fragmented, the duration value stored in the trak atom for each of the tracks under moov atom reflects the duration of the each of the samples in the track and the number of samples in the track. The duration value may then be used by the media player application to display a time bar representing the movie duration and a cursor indicating the current time within the movie duration. Assuming that the tracks are of equal duration, or the user has selected the longest track, the user is thereby provided with an indication of how much of the total movie duration has elapsed. If the tracks are not of equal duration and the user has selected a track other than the longest, the display of movie duration may mislead the user.

In the case of a file that is fragmented, the duration value that is read from the moov atom may be the duration of the longest track of the first fragment. The duration values that are stored in the moof atoms are the durations of the tracks of the respective fragments. Thus, the conventional media player application may not be able to display a reliable indication of the actual movie duration.

The conventional MP4 file format does not provide easily accessible information regarding the offset of a fragment from the start of the file. Fragment offset would provide a helpful tool for browsing the fragmented file. A user who wishes to display the Nth movie fragment of a fragmented MP4 file must parse the track of interest and accumulate the offsets under the moov atom and subsequent moof atoms (up to the N−1th moof) in order to obtain the offset of the Nth fragment relative to the beginning of the movie and then jump to the required offset.

During a live recording session it may be desired to build an incremental presentation by adding a track after media data for other tracks has already been acquired. Referring to FIG. 3, using the current conventional MP4 file format the trak atom is added to the moov atom and the media data may be added using an additional moof atom. The moov atom contains the properties of the track whereas the mdat atom for the track is associated with the added moof atom. This approach may involve buffering a huge amount of media data for existing tracks while waiting for additional tracks. Since the trak atom is added to the moov atom, the moov atom is enlarged, changing the locations of the metadata and media data for the existing tracks, and it is necessary to recalculate and update the offset values stored in the tracks that have previously been saved in the moov atom. Rearranging the media data and metadata may involve significant processing computation/time and memory operations. The above mentioned situations could become more challenging when pre-buffered data (that is, data of the new track that is already present) is to be recorded.

As shown in FIG. 4, the moov atom may contain a user data atom of type "udta" declaring user information about the container atom and its data relevant to the movie as a whole.

SUMMARY OF THE INVENTION

In accordance with a first aspect of the subject matter disclosed herein there is provided a method of creating a file that is compatible with a media player application that reads media files compliant with MP4, comprising including in the file a parent container containing a plurality of child containers, said child containers including a metadata container containing metadata relating to the media presentation and a media data container containing media samples for a plurality of tracks of the media presentation, and wherein the metadata container contains a plurality of child containers containing metadata for the plurality of tracks respectively, said method comprising including in the metadata container at least one additional child container that reserves free space in the metadata container but does not contain metadata, whereby in the event of adding a track to the presentation the free space in said additional child container may be overwritten with metadata for the added track without affecting the size of the metadata container.

In accordance with a second aspect of the subject matter disclosed herein there is provided a method of processing a file containing a presentation that is compatible with a media player application that reads media files compliant with MP4, wherein the presentation includes a first track composed of fragments corresponding to respective intervals, said method comprising adding a second track that includes pre-buffered data to the file, wherein the pre-buffered data is composed of fragments corresponding to said intervals, whereby for each fragment of the pre-buffered data of the second track there is a corresponding fragment of the first track, and each track represents a timed sequence of frames, selecting a fragment of the second track included in the pre-buffered data, scanning the selected fragment of the second track and selecting an I frame within the selected fragment, scanning the fragment of the first track corresponding to the selected fragment of the second track and selecting an I frame within the corresponding fragment, and constructing a media file compliant with MP4, wherein the media file contains a presentation including the first track and the second track utilizing data commencing with the selected I frames.

In accordance with a third aspect of the subject matter disclosed herein there is provided a non-transitory computer-readable storage medium containing a media presentation file organized as a parent container containing a plurality of child containers, said child containers including a metadata container containing metadata relating to the media presentation, a media data container containing media samples for a plurality of tracks of the media presentation, and a user data container containing objects that declare user information relating to the parent container and data stored therein, wherein at least one track is composed of at least two fragments each having a duration and the user data container contains a data field that specifies the aggregate duration of said fragments of said one track.

In accordance with a fourth aspect of the subject matter disclosed herein there is provided a composition unit for receiving media data for multiple tracks of a presentation and processing the media data to create an MP4 file, wherein the media data comprises a succession of key frames and dependent frames for each track, the MP4 file contains media data for fewer than all of said multiple tracks up to a time of interest that is prior to a current time, and the composition unit comprises a computing machine that is programmed in a manner such that: the computing machine provides a buffer that stores the media data for each track prior to processing the media data to add to the MP4 file, whereby the buffer stores media data received subsequent to said time of interest and up to said current time, and the computing machine adds a track to the MP4 file starting at said time of interest by identifying an earliest key frame subsequent to said time of interest of each track contained by the MP4 file prior to said time of interest, identifying an earliest key frame subsequent to said time of interest of the track to be added to the MP4 file, and adding media data of each track contained by the MP4 file prior to said time of interest and of the track to be added to the MP4 file, starting in each case with the identified key frame of the track, to the MP4 file.

BRIEF DESCRIPTION OF THE DRAWINGS

For a better understanding of the invention, and to show how the same may be carried into effect, reference will now be made, by way of example, to the accompanying drawings, in which:

FIG. 6 illustrates the structure of an MP4 file that avoids the problem illustrated by FIG. 3, in accordance with the subject matter disclosed herein.

DETAILED DESCRIPTION

Figure 5:
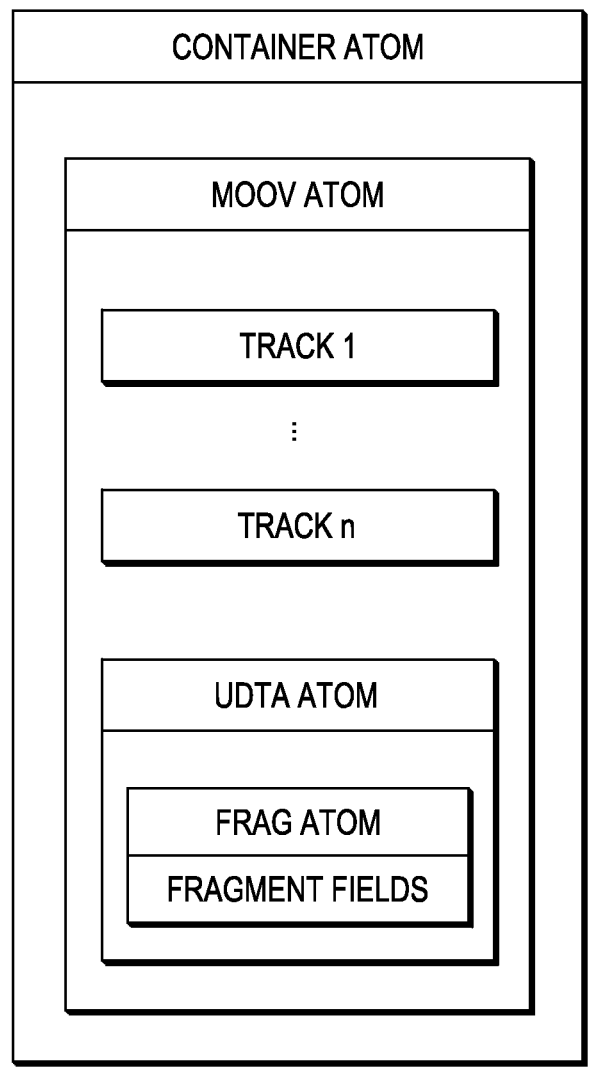
FIG. 5 illustrates the structure of an MP4 file including a frag atom in accordance with the subject matter disclosed herein.

Referring to FIG. 5 of the drawings, in accordance with the subject matter disclosed herein the udta atom, whose immediate parent is the moov atom, contains an atom (referred to herein as type "frag") that facilitates handling of fragment information. The frag atom may contain the following fields:

| Field | Comment |
| --- | --- |
| Track ID | List of track ids of all the tracks present in the file. |
| Track Duration | Duration of each track, i.e. the total duration of all the fragments of the track. |
| Total Tracks | Total tracks present in the file. |
| Total Key Frames | Total number of key frames present in the file. |
| Key Frame Offset | Key frame's absolute offset in the file. It followed by the Key Frame Time. |
| Key Frame Time | Time stamp corresponding to the key frame. |
| Total Movie Duration | Total duration of the complete movie. It is the duration of the longest fragmented track. |
| Total Fragments | Total number of fragments present in the file. |
| Fragment Offset | Offset of each fragment followed by the Fragment duration. |
| Fragment Duration | Duration of each fragment. |

The frag atom does not affect the information stored in other atoms.

It will be seen from the foregoing list of fields in the frag atom that the frag atom contains a list of the names (IDs) of all the tracks present in the file. This differs from the conventional moov atom, which contains a trak atom for each track of the movie but does not necessarily contain a list of the names of the tracks.

For each track, the frag atom specifies the duration of the track. Since the duration of each track is provided separately, when a given track is chosen for playback, the player can display a time bar representing the correct duration of the track.

The information regarding key frames may be helpful in navigating (especially for trick plays e.g. fast forward, rewind operations) through the movie.

The total movie duration is the duration of the track having maximum duration. This information is helpful because the player application does not then need to parse the entire file i.e. moov and all the moof representatives of each track, in order to compute the total duration. This may save considerable processing effort and avoid delays The fragment offset and duration provide a compatible player with a way to jump to a point of interest in the file without traversing the file.

A player that is able to read the frag atom is able to determine, among other things, the duration of each fragment so that the player can calculate the actual duration of a movie composed of multiple fragments. Further, since the offset of each fragment is provided the application can jump to any fragment of interest without having to parse the entire moov atom and the subsequent moof atoms (as the information on the offsets and duration is already available).

Because the frag atom is a sub-atom of the udta atom, and the udta atom is a sub-atom under the moov atom, a media player application that does not recognize the frag atom will skip this atom and employ traditional playback methods.

The frag atom may be specified as a custom atom using a conventional software development kit.

In order to avoid or at least reduce problems associated with rearranging media data and metadata when adding tracks to a presentation, an atom of type "free" or "skip" may be included in the moov atom. The free and skip atoms reserve space that is otherwise unused. The free and skip atoms consist only of a header containing atom size and type fields followed by free space. Referring to FIG. 6, in the event that the user wishes to add a track to the movie, the trak atom may be placed in the moov atom and take up some or all of the space occupied by the free or skip atom, thus avoiding changing the size of the moov atom. The media data for the added track starts from a moof atom that is added after any existing moof atoms (and their corresponding mdat atoms). Thus, it is not necessary to rearrange the media data and metadata for tracks that were previously present.

Figure 7:
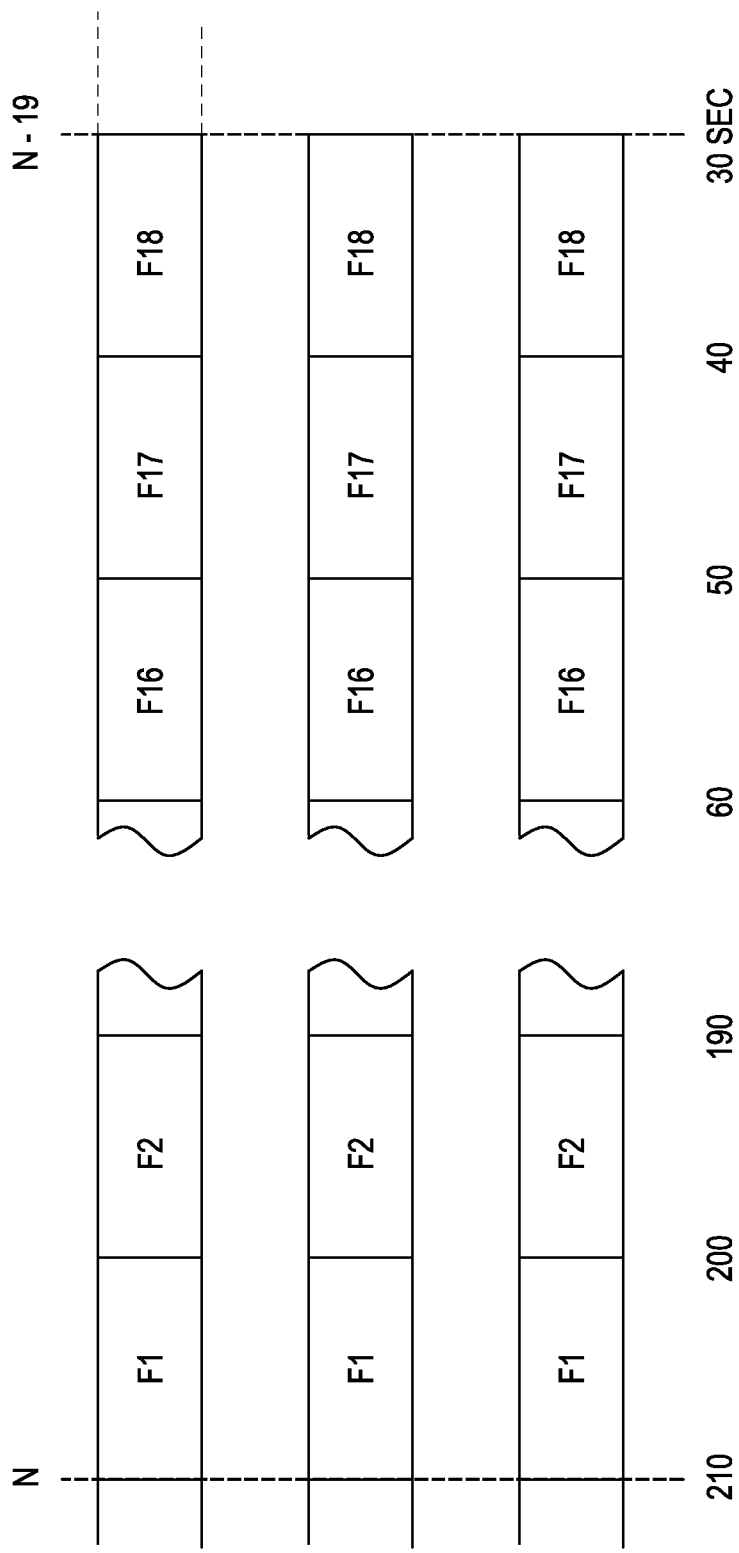
FIGS. 7 and 8 illustrate a method for adding tracks to an existing fragmented presentation.
Figure 8:
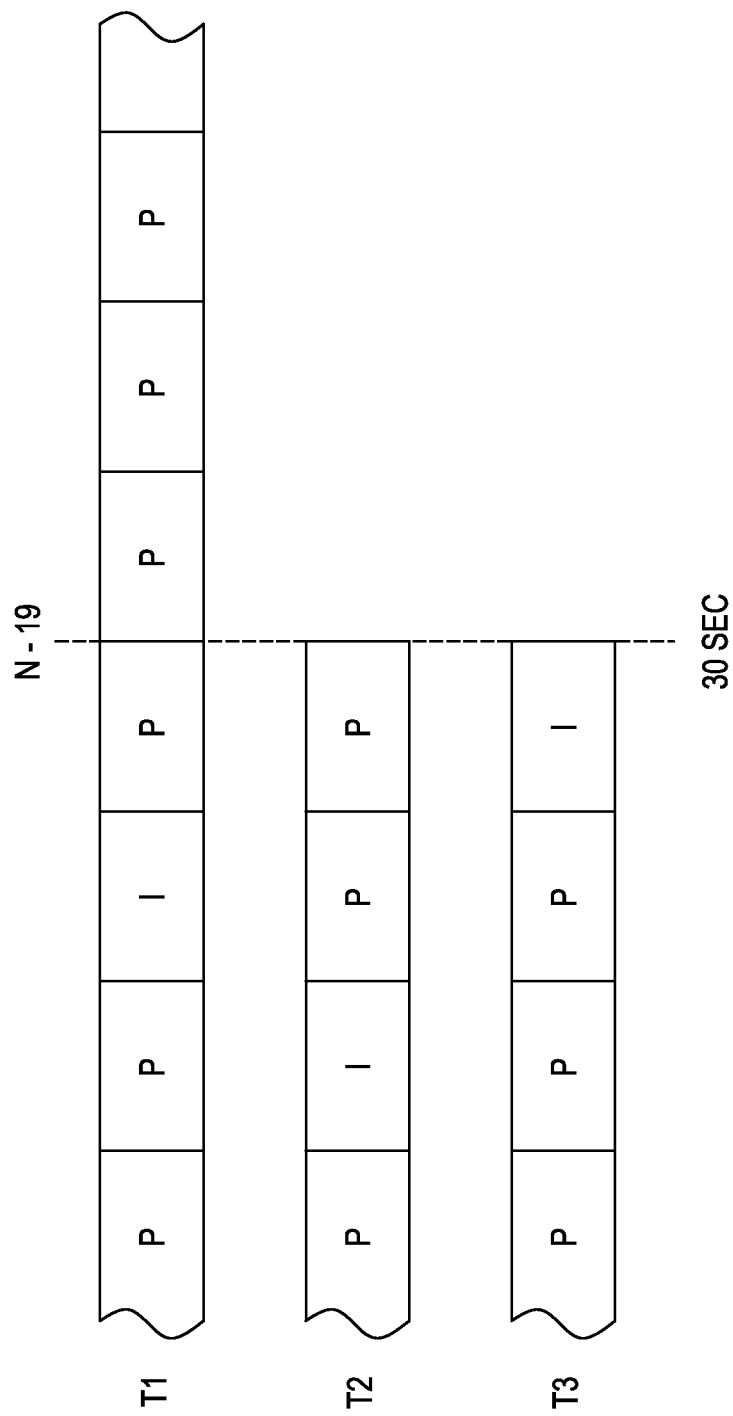

Successful addition of one or more tracks to a movie that comprises one or more existing tracks may be more difficult in the event that pre-buffered data of the new track(s) is to be recorded. Referring to FIG. 7, we assume for simplicity that the movie is composed of segments that are 10 sec in duration, that one track (T1) has already been recorded up to time N (t=210 sec), such that the current fragment covers from 200 to 210 sec, and that a pre-buffer contains data for tracks T1, T2 and T3 for the 18 fragments yet to be recorded, covering the interval from 30 sec to 210 sec. FIG. 7 shows the fragments F1-F18. Data to the right of the line representing time N−19 (for track T1 only) has already been recorded. FIG. 8 shows individual frames of the tracks just after time N−19 as well as individual frames of track T1 that have been recorded and have times just before N−19.

We wish to add tracks T2 and T3 to the movie. An MP4 composition unit, i.e. a unit that receives digital media data (e.g. audio and/or video) and creates MP4 content from that data, scans the pre-buffered data for the fragment F18 (which covers the interval from 30 sec to 40 sec) and identifies the oldest I frame of each track. It will be appreciated that each fragment contains multiple I frames. FIG. 8 shows the oldest I frame of each track. The composition unit starts processing the data for all three tracks at the oldest I frame for each track and creates the mdat atoms for each track and records the reconstructed MP4 file accordingly. In addition, the composition unit updates the headers of the trak atoms (to specify the new media attributes added) and updates the udta atom with the modified offsets, time periods, etc. for the newly added tracks T2 and T3 as well as the track T1. The file is reconstructed starting at 30 sec taking into consideration the media data of all three tracks. In this manner, the proper phase relationship between the existing (T1) and new (T2, T3) tracks is preserved.

Figure 9:
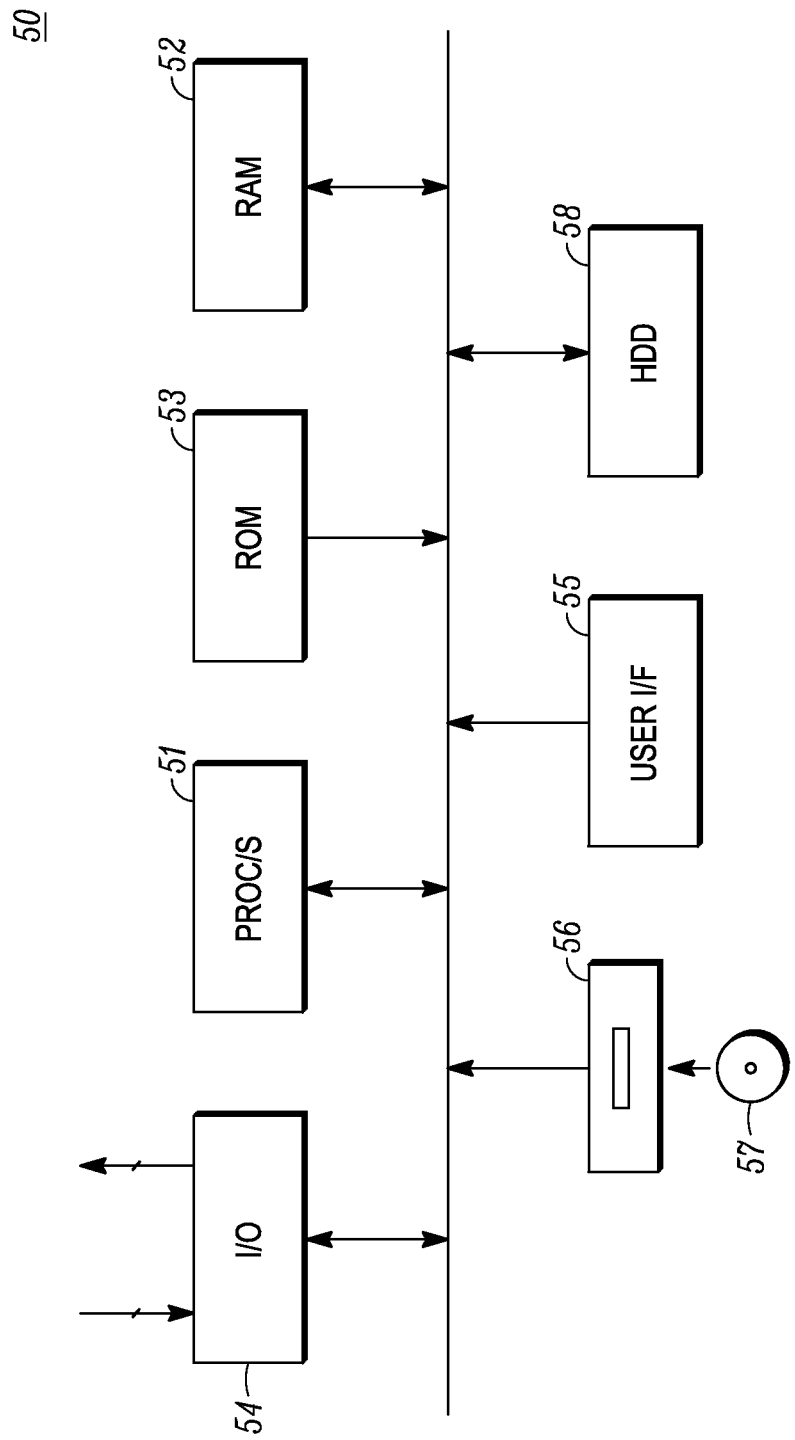
FIG. 9 is a block schematic diagram of a computer that may be used to implement a composition unit.

Referring to FIG. 9, a suitable composition unit may be implemented as a special purpose computer 50 comprising one or more processors 51, random access memory 52, read-only memory 53, I/O devices 54, a user interface 55 and a hard disk drive 58, configured in a generally conventional architecture. The computer operates in accordance with a program that is stored in a non-transitory computer readable medium, such as the hard disk drive 58 or a CD-ROM 57, and is loaded into the random access memory 52 for execution. The program is composed of instructions such that when the computer receives bitstreams conveying media data for multiple tracks by way of a suitable interface included in the I/O devices 54, the computer allocates memory to appropriate buffers and utilizes other suitable resources and functions to perform the various operations that are described above with reference to FIGS. 7 and 8 as being performed by the composition unit. It will be appreciated by those skilled in the art that the program might not be loadable directly from the CD-ROM 57 into the random access memory utilizing the CD-ROM drive 56 and that generally the program will be stored on the CD-ROM or other distribution medium in a form that requires the program to installed on the hard disk drive 58 from the CD-ROM 57.

Figure 1:
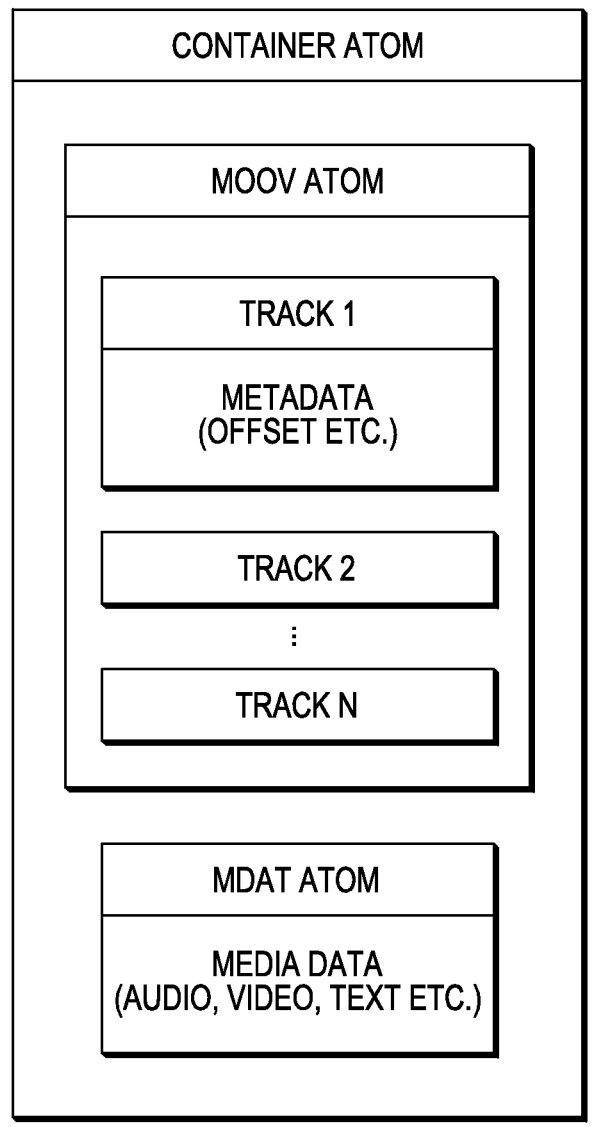
FIG. 1 illustrates the structure of a non-fragmented MP4 file.
Figure 2:
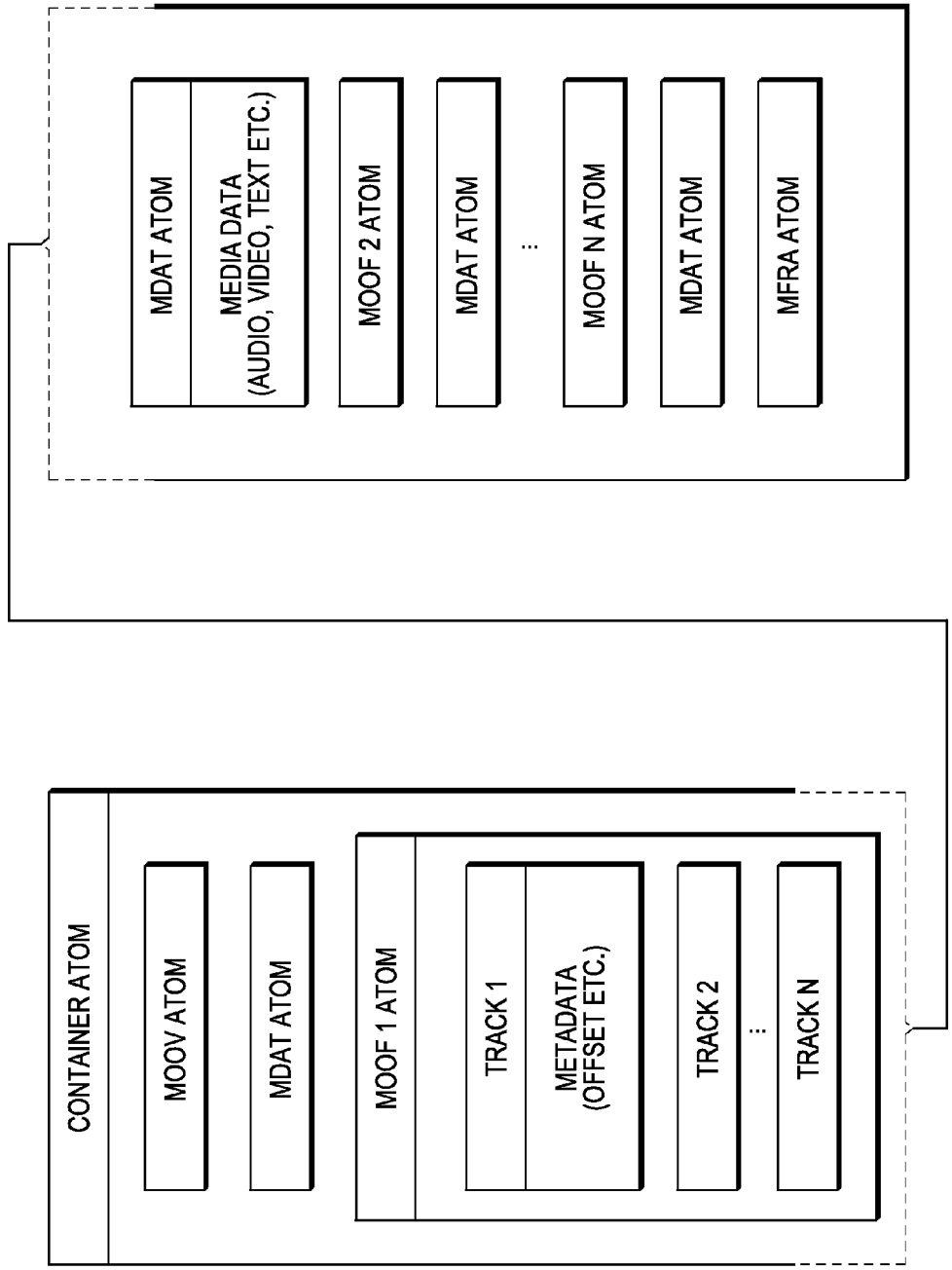
FIG. 2 illustrates the structure of a fragmented MP4 file.
Figure 3:
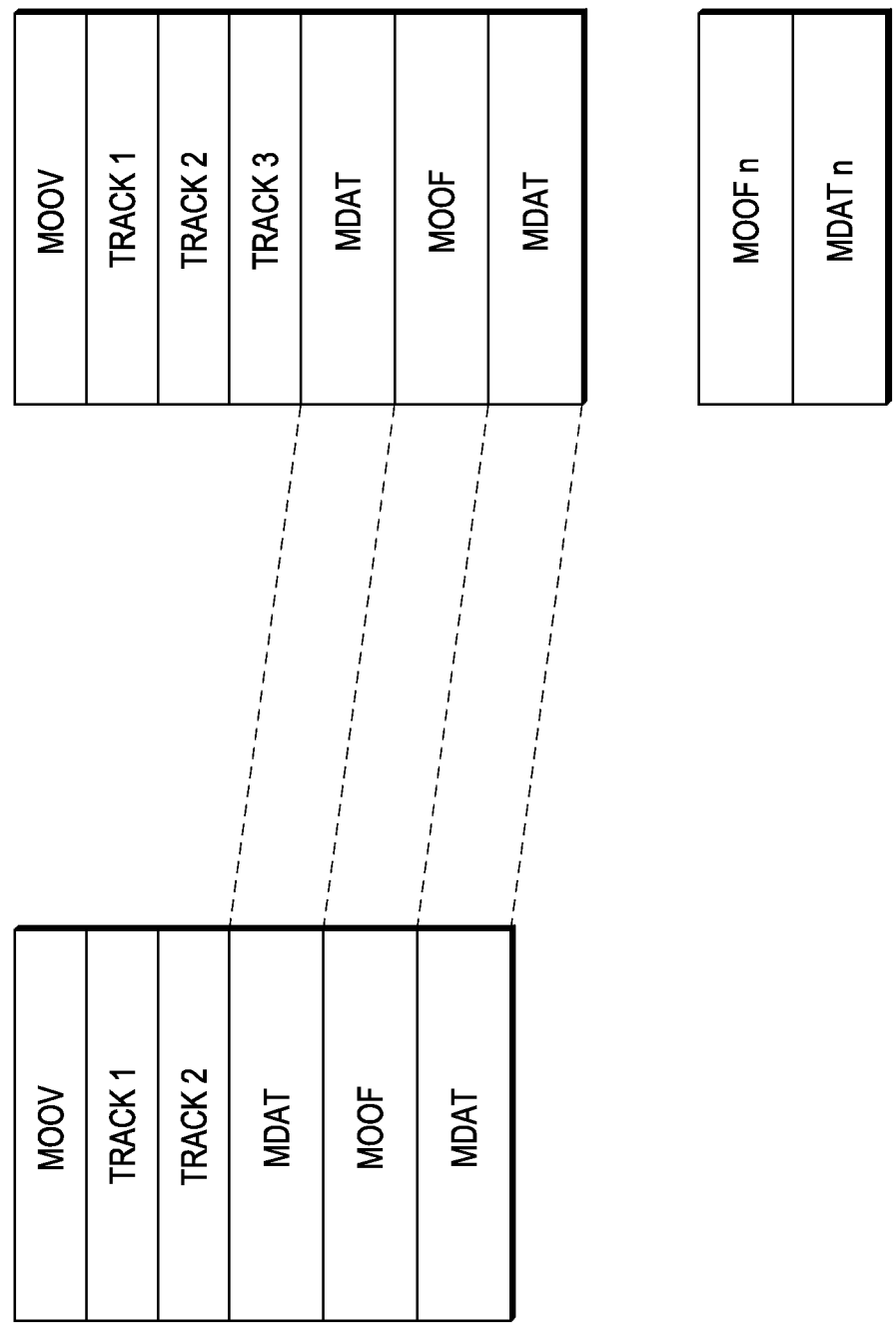
FIG. 3 illustrates a problem with use of files having the conventional MP4 format.
Figure 4:
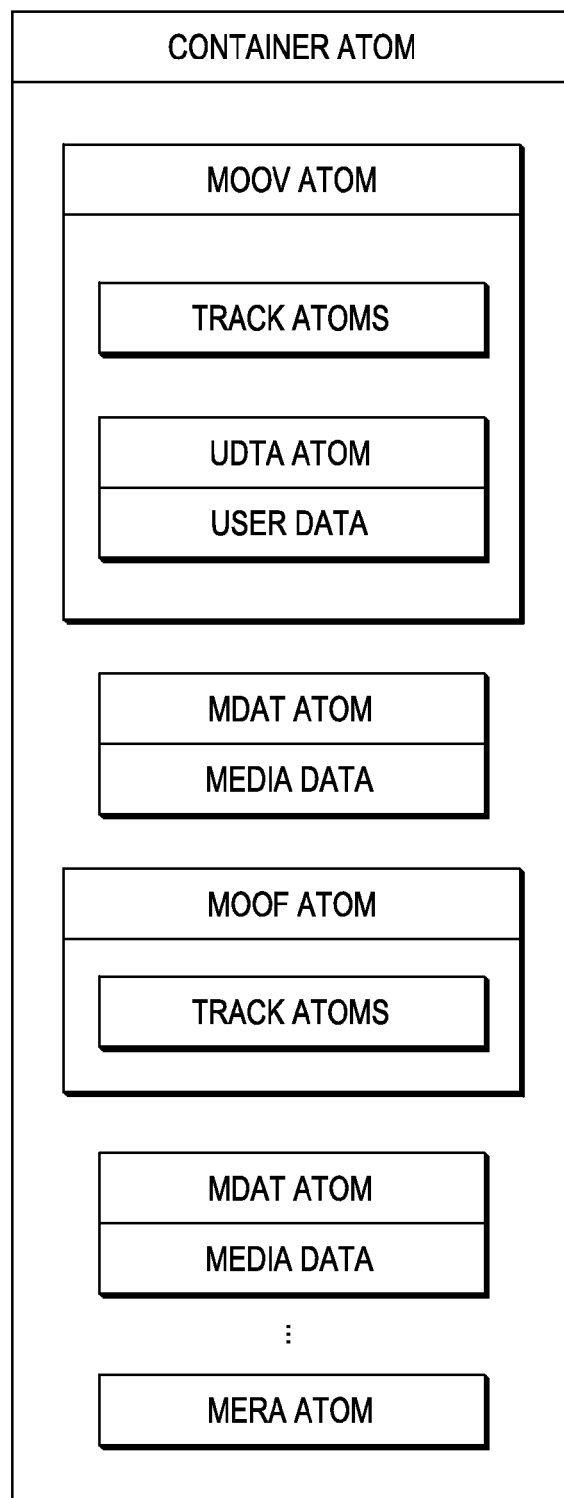
FIG. 4 illustrates the structure of a fragmented MP4 file containing user data.

A computer having the topology shown in FIG. 9, when running an MP4 player application, may also be used to play back a presentation stored on a non-transitory storage medium, such as the CD-ROM or a flash drive, for example. Thus, a movie composed of an MP4 file having the structure described with reference to FIG. 4, 5 or 6, or composed using a composition unit operating in the manner described with reference to FIGS. 7 and 8, may be stored on a CD-ROM and played back using the CD-ROM drive 56.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of processing a file containing a presentation that is compatible with a media player application that reads media files compliant with MP4, wherein the presentation includes a first track comprising video data, the first track composed of fragments corresponding to respective intervals, said method comprising:

adding to the file a second track comprising video data, the second track including pre-buffered data, wherein the pre-buffered data is composed of fragments corresponding to said intervals, whereby for each fragment of the pre-buffered data of the second track there is a corresponding fragment of the first track, and each track represents a timed sequence of frames, selecting, at a time of interest, a fragment of the second track included in the pre-buffered data for insertion sequentially in time next to one of the fragments of the first track, scanning the selected fragment of the second track and selecting an I frame within the selected fragment based on an earliest I frame of the second track subsequent to said time of interest, scanning the fragment of the first track corresponding to the selected fragment of the second track and selecting an I frame within the corresponding fragment, and constructing a media file compliant with MP4, wherein the media file contains a presentation including the first track and the second track utilizing data commencing with the selected I frame of the second track.

2. A method according to claim 1, wherein the constructed media file is compatible with a media player application that records media files compliant with MP4.

3. A method according to claim 1, wherein the selected fragment of the second track included in the pre-buffered data is an earliest fragment included in the prebuffered data and the selected I frame within the earliest fragment is an earliest I frame within the earliest fragment.

4. A method according to claim 1, wherein the first track includes prebuffered data received subsequent to the time of interest, the corresponding fragment of the first track is an earliest fragment included in the pre-buffered data of the first track and the selected I frame is an earliest I frame within the corresponding fragment.

5. A composition unit for receiving media data for multiple tracks of a presentation and processing the media data to create an MP4 file, wherein the media data comprises a succession of key frames and dependent frames for each track, the MP4 file contains media data for fewer than all of said multiple tracks up to a time of interest that is prior to a current time, and the composition unit comprises a computing machine that is programmed in a manner such that:

the computing machine provides a buffer that stores the media data for each track prior to processing the media data to add to the MP4 file, whereby the buffer stores media data received subsequent to said time of interest and up to said current time, and the computing machine adds a track to the MP4 file starting at said time of interest by identifying an earliest key frame subsequent to said time of interest of each track contained by the MP4 file prior to said time of interest, identifying an earliest key frame subsequent to said time of interest of the track to be added to the MP4 file, and adding media data of each track contained by the MP4 file prior to said time of interest and of the track to be added to the MP4 file, starting in each case with the identified key frame of the track, to the MP4 file.

6. A method for receiving media data for multiple tracks of a presentation and processing the media data to create an MP4 file, wherein the media data comprises a succession of key frames and dependent frames for each track, the MP4 file contains media data for fewer than all of said multiple tracks up to a time of interest that is prior to a current time, the method comprising:

providing, in a computing device comprising one or more processors communicatively coupled to one or more memory units, a buffer in the one or more memory units that stores the media data for each track prior to processing the media data to add to the MP4 file, whereby the buffer stores media data received subsequent to said time of interest and up to said current time, and in the computing device, adding a track to the MP4 file starting at said time of interest by identifying an earliest key frame subsequent to said time of interest of each track contained by the MP4 file prior to said time of interest, identifying an earliest key frame subsequent to said time of interest of the track to be added to the MP4 file, and adding media data of each track contained by the MP4 file prior to said time of interest and of the track to be added to the MP4 file, starting in each case with the identified key frame of the track, to the MP4 file.

7. A non-transitory computer-readable storage medium comprising stored instructions which, when executed by the one or more processors, cause the one or more processors to perform the method of claim 6.

8. A method comprising:

processing a file containing a presentation that is compatible with a media player application that reads media files compliant with MP4, the presentation including a first track including video data fragments corresponding to a respective time interval, during the processing of the file containing the presentation, the method further includes:

adding a second track including pre-buffered video data that includes at least one fragment corresponding to the time interval;

for each fragment of the pre-buffered video data of the second track there is a corresponding fragment of the first track, and the first track and the second track represents a timed sequence of frames, selecting the at least one fragment of the second track;

selecting an earliest key frame within the time interval of the selected at least one fragment of the second track during a scan of the selected at least one fragment of the second track;

scanning the fragment of the first track corresponding to the selected fragment of the second track and selecting an earliest key frame within the corresponding fragment of the first track, and constructing a media file compliant with MP4, wherein the media file contains a presentation including, video data of the first track prior to the key frame within the corresponding fragment of the first track, and video data of the second track commencing with the selected key frame of the selected at least one fragment of the second track.

9. A method according to claim 8, wherein the constructed media file is compatible with a media player application that records media files compliant with MP4.

10. A method according to claim 8, wherein the selected fragment of the second track included in the pre-buffered data is an earliest fragment included in the prebuffered data and the selected key frame within the earliest fragment is an earliest key frame within the earliest fragment.

11. A method according to claim 8, wherein the first track includes prebuffered data received subsequent to a time of interest, the corresponding fragment of the first track is an earliest fragment included in the pre-buffered data of the first track and the selected key frame is an earliest key frame within the corresponding fragment.

12. A composition unit for receiving media data for multiple tracks of a presentation and processing the media data to create media content file, wherein the media data includes a succession of key frames and dependent frames for each track, the media content file contains media data for fewer than all of said multiple tracks up to a time of interest that is prior to a current time, and the composition unit comprises a computing machine that is programmed in a manner such that:

the computing machine provides a buffer that stores the media data for each track prior to processing the media data to add to the media content file, whereby the buffer stores media data received subsequent to said time of interest and up to said current time, and the computing machine adds a track to the media content file starting at said time of interest by identifying an earliest key frame subsequent to said time of interest of each track contained by the media content file prior to said time of interest, identifying an earliest key frame subsequent to said time of interest of the track to be added to the media content file, and adding media data of each track contained by the media content file prior to said time of interest and of the track to be added to the media content file, starting in each case with the identified key frame of the track, to the media content file.

13. The composition unit according to claim 12, wherein each track includes at least one video data fragment, and the at least one video data fragment as a corresponding time interval.

14. The composition unit according to claim 12, wherein each track includes at least one video data fragment, and the earliest key frame is the oldest key frame of the at least one video data fragment.

15. The composition unit according to claim 12, wherein the media content file includes an amount of free space, and the added media data reduces the amount of the free space.

* * * * *